Figure 1:
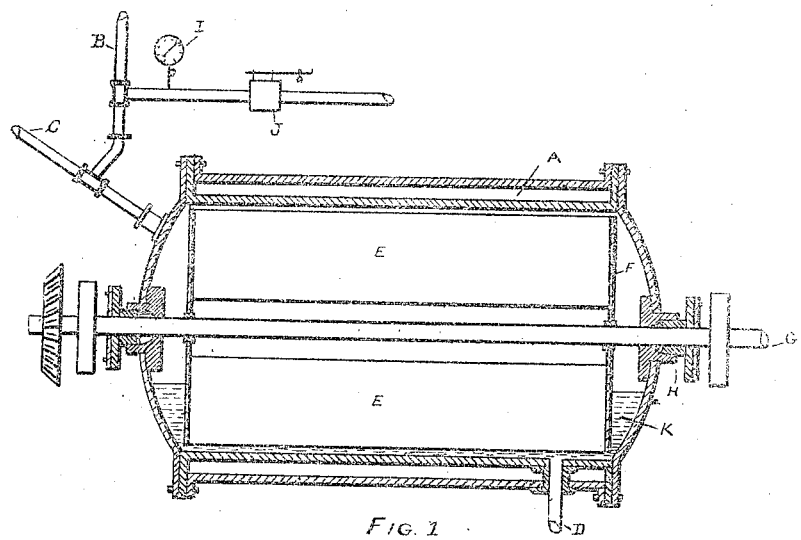

W. C. BLADEN.
METHOD OF MAKING SO-CALLED ALKALIZED COCOA.
APPLICATION FILED NOV. 24, 1916.

1,243,244. Patented Oct. 16, 1917.

WITNESSES
George N. Ullmann
Chas A. Ullmann

INVENTOR
Walter Clement Bladen

UNITED STATES PATENT OFFICE.

WALTER CLEMENT BLADEN, OF JERSEY CITY, NEW JERSEY.

METHOD OF MAKING SO-CALLED ALKALIZED COCOA.

1,243,244.  Specification of Letters Patent.  Patented Oct. 16, 1917.

Application filed November 24, 1916. Serial No. 133,178.

*To all whom it may concern:*

Be it known that I, WALTER CLEMENT BLADEN, a subject of the King of Great Britain, and a resident of Jersey City, in the county of Hudson and State of New Jersey, have invented certain new and useful Improvements in the Method of Making So-Called Alkalized Cocoa, of which the following is a specification.

It is well known that when cocoa powder in various stages of its manufacture, is treated with a solution or suspension in water of any of the alkalis, such as sodium or ammonium carbonate and hydrate, potassium carbonate, calcium or magnesium oxid, either singly or mixed, certain not clearly defined reactions take place whereby the flavor of the finished cocoa is enhanced and its color darkened and improved.

The method employed in this treatment may be any one of several. According to one process, the semi-roasted, cracked and cleaned cocoa beans are thoroughly mixed with a solution or suspension in water, of the alkali selected and after storing in a hot room for a given period (24-48 hours) are re-roasted to completion, ground and the liquor so obtained, pressed to remove cocoa butter, the resultant press cakes being pulverized in the accepted manner. Another process calls for the addition of the alkali to the liquor and working the mass in a heated kneading machine or melangeur until the water is driven off, or as nearly completely so as possible. Still a third and different process calls for spraying the cocoa powder itself with the alkaline solution and working in a heated machine until the water is driven off; or, the water may in part be removed in this manner, the last traces being driven off by storing the cocoa powder in hot closets.

The objections to all of the foregoing methods are as hereinafter specified. In the first method, the solution being applied to solid fragments of the bean, only a limited surface is presented to the action of the alkali, as a result of which, a time factor affecting penetrability is introduced, causing inequalities of alkalization with consequent variation in flavor. In the second process, the plan of treating the liquor is a more logical one as regards uniformity of treatment. Unfortunately however, the alkali solvent or vehicle, water, causes a thickening of the liquor to an emulsion-like body and the subsequent removal of the water therefrom requires the liquor to be processed for a period of from four to five hours, even when the amount so treated is only 400 pounds. As a result, the cost of treating by this process is so high as to make its use prohibitive. In addition, when, as is sometimes the case, ammonia carbonate or hydroxid is used, it is found exceedingly difficult to remove the odor of ammonia without completely expelling the water. In both of the foregoing processes, after the addition of the alkali, the cocoa is subjected to abnormal temperatures which are incidental to manufacturing and assist in ridding the product of water. In the third process however, the cocoa is practically finished and any further heat treatment is solely for the purpose of removing water. As a consequence the cost and time required for manufacture is increased and in addition there is a tendency to destroy the characteristic odor and flavor. Cocoa powder also readily absorbs foreign odors and if ammonia is used in treating, it is found to be practically impossible to remove the odor therefrom.

The preparation of cocoa having an added alkali content, has not met with unqualified approval and there are many who, while readily admitting the superiority of the beverage resulting from the beans, liquor or cocoa so treated, are not prepared to admit that the inclusion of chemicals is not prejudicial to health.

Viewed from this standpoint, ammonia salts would appear to be the most desirable alkali to use, as thereby the inclusion of "added alkali" in the finished product would be obviated, due to the volatile nature of such compounds. Apart, however, from the aforementioned objections attendant upon the use of these alkalis, there must be considered their chemical and physical properties and these, as will be shown, are such as to militate against their successful use.

Ammonium hydroxid is a solution of the gaseous radical $NH_3$ in water. The maximum solubility of this gas in water at normal temperatures, is only about 28%. The solubility of any gas decreases with an increase in temperature and inasmuch as alkalization is always carried on at abnormal temperatures, the strength of the solution employed would constantly decrease in direct proportion to the temperature employed and the duration of the treatment.

Ammonium carbonate has only a limited solubility in cold water and as hot water chemically decomposes it, only very dilute solutions may be employed, which, due to the milder character of this alkali, are not effective.

This invention has as its object, the provision of an entirely new process, in which, by the use of an anhydrous volatile alkali, namely anhydrous ammonia, all of the mechanical objections attendant upon the use of the present methods, as before specified, are eliminated. In addition, my process provides for the manufacture of cocoa in which will ultimately be found no "added alkali."

By the use of suitably modified forms of the apparatus hereinafter described, the anhydrous ammonia may be applied at any stage of the manufacture, as for instance; to the beans, before or after roasting; to the liquor before pressing, or to the cocoa powder itself. I prefer to treat the liquor.

A preferred method of treating with anhydrous ammonia is substantially as follows: I introduce into a suitably closed vessel, a quantity of liquor and anhydrous ammonia in the form of a gas. By means of an agitator consisting of rotating peripheral scoops, the liquor is caused to be continuously projected into the surrounding atmosphere of ammonia gas, the treatment being continued until the desired degree of alkalization has been accomplished, which is denoted by the depth of color. Preferably, the vessel is only filled to about one third its capacity with the liquor. It may however, be almost entirely filled with the liquor, in which case the gas is atomized through the liquor, the agitator being used to effect an intimate mixture.

The temperature which I prefer to work at is about 100 degrees Fahrenheit. It is expressly understood however, that this temperature is not a necessary part of my invention and I do not limit myself to its use, as I can also produce successful treatment of the liquor at the lowest temperature consistent with fluidity, or at such other higher temperatures as will not impair the flavor of the product.

The great technical advantages which I claim for my process over all others are: the production of a uniformly treated cocoa; a very substantial reduction in the cost of production and a finished product of superior flavor which is free from "added mineral matter."

Figure 2:
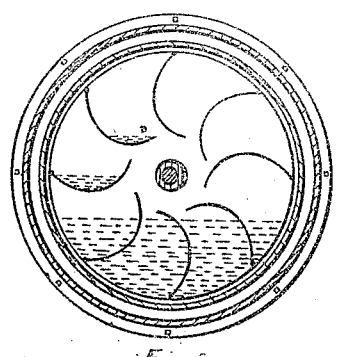

Apparatus suitable for carrying out the process is shown in the accompanying drawing, of which, the following is a description: Figure 1 is a vertical axial section and Fig. 2 is a vertical transverse section. Fig. 1 is a stationary horizontal cylinder having a steam jacket (A), ammonia and liquor supply and discharge pipes (B, C and D), and revolving peripheral agitators (E) fastened to end plates (F) which are rotated by a central shaft (G) journaled in stuffing boxes (H) set in the cylinder heads; a pressure gage (I) and safety valve (J) which is connected with a receiver for excess pressure. The line (K) shows the liquor level.

I claim as my invention:

1. The process of subjecting cocoa in various stages of its manufacture, to the action of anhydrous ammonia.

2. The process of subjecting cocoa in various stages of its manufacture to the action of a compressed atmosphere of anhydrous ammonia.

3. The process of making alkalized cocoa which consists in agitating cocoa liquor with anhydrous ammonia in such manner as to produce an intimate contact between the two.

4. The process of subjecting cocoa liquor to the action of anhydrous ammonia held within a suitably closed vessel, intimate contact of ammonia gas and liquor being effected through the agency of rotating peripheral agitators.

5. The process of subjecting cocoa liquor to the action of a compressed atmosphere of anhydrous ammonia held within a suitably closed vessel, intimate contact of ammonia gas and liquor being effected through the agency of rotating peripheral agitators.

Signed at Jersey City, in the county of Hudson and State of New Jersey, this 21st day of November, A. D. 1916.

WALTER CLEMENT BLADEN.

Witnesses:
George N. Ullmann,
Chas. A. Ullmann.